United States Patent
Galuten

(10) Patent No.: US 11,616,589 B2
(45) Date of Patent: *Mar. 28, 2023

(54) METHODS AND SYSTEMS FOR PERFORMING AND RECORDING LIVE MUSIC NEAR LIVE WITH NO LATENCY

(71) Applicant: Sony Interactive Entertainment LLC, San Mateo, CA (US)

(72) Inventor: Albhy Galuten, Santa Monica, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 16/912,569

(22) Filed: Jun. 25, 2020

(65) Prior Publication Data

US 2021/0409138 A1 Dec. 30, 2021

(51) Int. Cl.
*H04J 3/06* (2006.01)
*H04L 65/80* (2022.01)
(Continued)

(52) U.S. Cl.
CPC .......... *H04J 3/0667* (2013.01); *H04J 3/0664* (2013.01); *H04L 65/80* (2013.01); *H04N 21/242* (2013.01); *H04N 21/4307* (2013.01)

(58) Field of Classification Search
CPC ....... H04J 3/0667; H04J 3/0664; H04L 65/80; H04L 51/066; H04N 21/242;
(Continued)

(56) References Cited

U.S. PATENT DOCUMENTS 9,602,295 B1 * 3/2017 Weiner .................. H04M 3/562
10,043,502 B1 8/2018 Joshi
(Continued)

FOREIGN PATENT DOCUMENTS

AU 2010229093 A1 11/2011
CN 114120942 A1 3/2022
(Continued)

OTHER PUBLICATIONS

"International Search Report" and "Written Opinion of the International Searching Authority," Patent Cooperation Treaty Application No. PCT/US2021/038305, dated Sep. 30, 2021, 16 pages.
(Continued)

*Primary Examiner* — Vinncelas Louis
(74) *Attorney, Agent, or Firm* — Carr & Ferrell LLP

(57) ABSTRACT

Exemplary methods include a processor executing instructions stored in a memory for generating an electronic count-in, binding it to a first performance to generate a master clock and transmitting a first musician's first performance and first timing information to a network caching, storage, timing and mixing module. The first musician's first performance may be recorded locally at full resolution and transmitted to a full resolution media server and the first timing information may be transmitted to the master clock. The first musician's first performance is transmitted to a sound device of a second musician and the second musician creates a second performance, transmits it and second timing information to a network caching, storage, timing and mixing module. The first and second performances are mixed along with the first and the second timing information to generate a first mixed audio, which can be transmitted to a sound device of a third musician.

22 Claims, 12 Drawing Sheets

(51) Int. Cl.
   *H04N 21/242*   (2011.01)
   *H04N 21/43*    (2011.01)
(58) Field of Classification Search
   CPC .. H04N 21/4307; H04N 21/4223; H04N 7/15;
           H04N 21/2385; H04N 21/4788; H04H
           60/04; G10H 1/0058; G06F 16/639;
           G06T 3/4038; H04M 3/562
   See application file for complete search history.

(56) References Cited

U.S. PATENT DOCUMENTS

| | | | |
|---|---|---|---|
| 10,469,880 B1 | 11/2019 | Kravis et al. | |
| 2006/0280182 A1 | 12/2006 | Williams | |
| 2007/0039449 A1 | 2/2007 | Redmann | |
| 2007/0223675 A1 | 9/2007 | Surin et al. | |
| 2008/0201424 A1 * | 8/2008 | Darcie | H04N 7/15 709/204 |
| 2008/0219476 A1 * | 9/2008 | Okabayashi | H04H 60/04 381/119 |
| 2012/0203364 A1 | 8/2012 | Redmann | |
| 2013/0195204 A1 | 8/2013 | Reznik et al. | |
| 2013/0195207 A1 | 8/2013 | Xue | |
| 2014/0270181 A1 | 9/2014 | Siciliano | |
| 2014/0337442 A1 * | 11/2014 | Zhuang | H04L 51/066 709/206 |
| 2015/0042744 A1 | 2/2015 | Ralston et al. | |
| 2015/0254056 A1 * | 9/2015 | Walker | G06F 16/639 715/716 |
| 2016/0224311 A1 | 8/2016 | Touch et al. | |
| 2016/0248989 A1 * | 8/2016 | Cross | H04N 21/2385 |
| 2017/0163709 A1 | 6/2017 | Owen | |
| 2017/0272513 A1 | 9/2017 | Arrington et al. | |
| 2018/0196393 A1 * | 7/2018 | Oda | G10H 1/0058 |
| 2018/0288467 A1 * | 10/2018 | Holmberg | H04N 21/4788 |
| 2019/0035370 A1 | 1/2019 | Joshi | |
| 2019/0081715 A1 | 3/2019 | Arrington | |
| 2019/0215540 A1 * | 7/2019 | Nicol | H04N 21/4223 |
| 2019/0279607 A1 | 9/2019 | Joshi | |
| 2020/0118246 A1 * | 4/2020 | Adsumilli | G06T 3/4038 |
| 2021/0409134 A1 | 12/2021 | Galuten | |

FOREIGN PATENT DOCUMENTS

| | | | | |
|---|---|---|---|---|
| EP | 2986017 B1 * | 11/2017 | | H04L 47/70 |
| EP | 2986017 B1 | 11/2017 | | |
| JP | 2001145167 | 5/2001 | | |
| JP | 2002207492 A | 7/2002 | | |
| JP | 2005219631 A | 8/2005 | | |
| TW | 202207208 | 2/2022 | | |
| WO | WO2014100531 A1 | 6/2014 | | |
| WO | WO2021262616 A1 | 12/2021 | | |

OTHER PUBLICATIONS

"Extended European Search Report", European Patent Application No. 21181122.9, dated Nov. 4, 2021, 7 pags.

* cited by examiner

METHODS AND SYSTEMS FOR PERFORMING AND RECORDING LIVE MUSIC NEAR LIVE WITH NO LATENCY

CROSS REFERENCE TO RELATED APPLICATIONS

The present application is related to U.S. Non-Provisional patent application Ser. No. 16/912,578 as filed concurrently herewith on Jun. 25, 2020, titled "Methods and Systems for Performing and Recording Live Internet Music Near Live with no Latency", all of which is hereby incorporated by reference in its entirety.

BACKGROUND

Field of the Invention

The present disclosure relates to the fields of music performance and recording and to network latency and synchronization.

Description of the Related Art

Music is typically recorded with some combination of simultaneous performance and asynchronous performance. That is some or all of the musicians play music at one time and it is recorded as a single performance. Originally, all music was recorded with all the musicians playing at once as a single performance. In the 1950s, Les Paul first created a multi-track recorder so that he could play a second musical part on top of a pre-recorded musical part. After that, musicians began recording one or more of the instruments in an initial recording and then would add other instruments afterwards—this is known as overdubbing.

For the last 20 years, musicians have always wished that they could play live (at the same time) with other musicians in disparate locations and though this has been done to some degree, for most musical styles, the network latency is too great to create a useful recording. A good musician will find that a note or drumbeat is "out of time" with inaccuracies as low as a few milliseconds. Even at the speed of light it takes about 13 milliseconds to get from Los Angeles to New York (26 milliseconds for a round trip) and so this latency is too great for musicians to play together in real time.

SUMMARY OF THE INVENTION

Exemplary embodiments provide systems and methods for performing and recording live internet music near live with no latency.

Exemplary methods include a processor executing instructions stored in a memory for generating an electronic count-in, binding the electronic count-in to a first performance to generate a master clock and transmitting a first musician's first performance and first timing information to a network caching, storage, timing and mixing module. The first musician's first performance may be recorded locally at full resolution and transmitted to a full resolution media server and the first timing information may be transmitted to the master clock. Alternatively, a lower resolution version of the first musician's first performance may be transmitted to a compressed audio media server and the first timing information may be transmitted to the master clock.

Subsequently, according to exemplary embodiments, the first musician's first performance is transmitted to a sound device of a second musician and the second musician creates a second performance, transmits it and second timing information to a network caching, storage, timing and mixing module. The first and second performances are mixed along with the first and the second timing information to generate a first mixed audio, which can be transmitted to a sound device of a third musician. The third musician creates a third performance and third timing information, which is mixed with the first mixed audio to generate a second mixed audio. This process is repeated until a last musician has performed and been recorded.

Exemplary systems for network caching, storage, timing and mixing for media include an Internet bandwidth testing module configured to ping a network and determine a bandwidth to a first user device, a quality/latency setting module communicatively coupled to the Internet bandwidth testing module, the quality latency setting module configured to determine a resolution of media based on the bandwidth, and a network audio mixer communicatively coupled to the quality/latency setting module, the network audio mixer configured to transmit the media per the determined resolution to a first user device. The system includes a full resolution media server configured to receive from the first user device the media and a time synchronization code for a master clock and/or a compressed media server configured to receive from the first user device the media and a time synchronization code for a master clock.

Subsequently, according to various exemplary embodiments, the Internet bandwidth testing module pings the network and determines a bandwidth to a second user device in order to determine a resolution of the media to be transmitted to the second user device. In further exemplary embodiments, the media is a single mixed track combining performances of a plurality of musicians, the performances having a range of resolutions. In this case, both a full resolution media server and a compressed media server transmit the media to the network audio mixer, which transmits the media to the second user device. The system receives a performance from the second user device and mixes it with the single mixed track.

An exemplary system for managing Internet bandwidth, latency, quality and mixing of media includes a processor executing instructions stored in a memory for controlling a component for gauging bandwidth over a period of time, a component for varying different levels of compression, and a component for seamlessly stitching together various resolutions using a common time code with quality varying over time. All of the components are communicatively coupled to each other and bussed to a single fader.

BRIEF DESCRIPTION OF THE DRAWINGS

The above and still further objects, features and advantages of the present invention will become apparent upon consideration of the following detailed description of some specific embodiments thereof, especially when taken in conjunction with the accompanying drawings wherein like reference numerals in the various figures are utilized to designate like components, and wherein.

DETAILED DESCRIPTION

The elements identified throughout are exemplary and may include various alternatives, equivalents, or derivations thereof. Various combinations of hardware, software, and computer-executable instructions may be utilized. Program modules and engines may include routines, programs, objects, components, and data structures that effectuate the performance of particular tasks when executed by a processor, which may be general purpose or application specific. Computer-executable instructions and associated data structures stored in a computer-readable storage medium represent examples of programming means for executing the steps of the methods and/or implementing particular system configurations disclosed herein.

The present disclosure describes a mechanism for allowing musicians to play together serially in what is real time with regard to the sound of the musicians that come before. If there are a number of musicians playing a song together, the first person starts and, though the music might reach the second person with a delay of some number of milliseconds, that second person plays to what they hear and for them, the two performances are perfectly in time. Now the third person hears this performance of the first two people (in time with each other) as heard by the second person and though they may hear it later than it was actually played, they will play in time with what they hear and for them all three instruments will be perfectly in time. This can continue without limitation.

In order to effectuate this, a kind of serial recording is necessary. However, there could easily be quality degradation as the audio is transferred around the network. That is, once the music starts playing for one musician, it cannot be paused or slowed down but the bit rate (quality) could be lowered to enable accurate timing. It is proposed here that each performance be recorded in the cloud (e.g. on a network server) at full resolution and also compressed, if necessary. It may also need to be buffered locally to preserve fidelity so that when the final performance arrives in the cloud it will be at full resolution. In this way, even if the quality heard by a musician when playing was slightly compromised, it would not need to compromise the quality of their recording and transmission to the cloud and so the end result will be at full fidelity and with perfect time when all is played back at the end.

Figure 1:
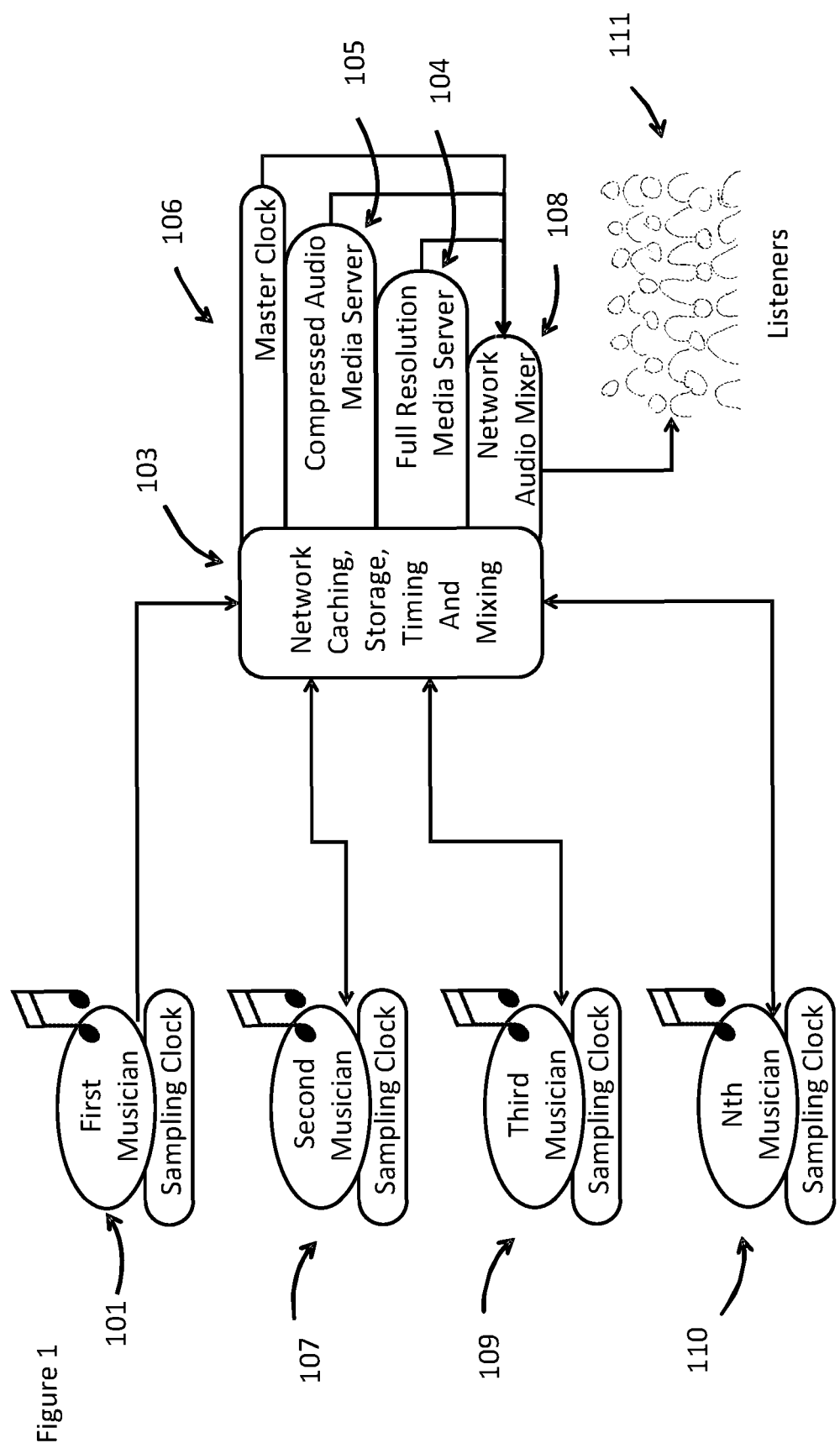
FIG. 1 is a high-level diagram of the architecture showing the musicians, the network services and the audience.

As can be seen in FIG. 1, the overall system is made of individual musicians (and their equipment and software and recordings) and the Network Caching, Storage, Timing and Mixing components. The scenario goes as follows:

The first musician (101) begins by saying or generating an electronic count-in (typically saying 1, 2, 3, 4). In various exemplary embodiments there is a signal—either digital data or audio data which signals the start of the piece as well as a cue for the other musicians to know when to start. In some cases, there might be a click track (a metronome) that the first (and possibly later) musician(s) play(s) to. In other cases, it could be a vocal count off or an instrumental pick up. Alternatively, there could be a visual cue such as would be given by a conductor. In any case this first mark (again, not necessarily a downbeat) is absolutely bound to the First Performance which together become the Master Clock which will be used to keep all the Local Clocks and performances in synch. It would be easiest to use NTP or Network Time Protocol but NTP is usually only accurate within 100 milliseconds. It is necessary that all of the participants' performances are bound to a common clock that is accurate to less than 1 millisecond. The first musician's (101) performance and timing information are sent to the Network Caching, Storage, Timing and Mixing Module (103).

Each musician's performance is recorded locally at full resolution. This is ultimately transferred to the Full Resolution Media Server (104). This can be sent in real time but may not be. In situations where there is not optimal bandwidth, this can be sent later.

If there is not enough bandwidth to send the full resolution audio without latency, a lower resolution version of the first musician's performance can be sent to the Compressed Audio Media Server (105). This lower resolution version should be sufficient for the musicians that follow to hear the parts that come before them and play to them. This lower resolution version should be as high quality as possible and in ideal network conditions should be virtually indistinguishable from the full quality version. It is possible, however, depending on bandwidth conditions that the full resolution audio would have to be sent later.

At the same time and as part of the same media files (both full resolution and compressed) the timing information is sent to the Master Clock (106). Audio is typically recorded at 44.1, 48 or 96 kilohertz and so, by definition, there is a clock that is much more accurate than the 1 millisecond required herein. Time stamps associated with the audio recording are used to set and synchronize the clock.

When the Second Musician (107) hears the music from the Full Resolution Media Server (104) or the Compressed Audio Media Server (105) depending on Network Bandwidth, the Second Musician (107) and adds their performance. The Second Musician's Performance is now sent to the Network Caching, Storage, Timing and Mixing Module (103) where the audio and timing information are stored. At the same time the audio of the first two musicians is combined (or mixed) by the Network Audio Mixer (108) and, along with the timing information, sent to the third musician (109) who's performance is sent back to the Network Caching, Storage, Timing and Mixing Module (103) where the new audio and timing information are stored along with the other performances and then sent to further musicians until the last musician (110) has performed and been recorded.

The Network Audio Mixer (108) not only combines the performances of the individual musicians for each other to hear but also combines the cumulative performance of all the musicians for the Audience (111) to hear. As will be described in more detail below, the Network Audio Mixer (108) does not just combine the different tracks (or performances) but combines them in such a manner as to provide maximum fidelity. So, for example, if one musician's performance, due to bandwidth constraints is at a lower resolution but their bandwidth improves, their quality will also improve. Additionally, the full resolution versions will eventually make it to the Full Resolution Media Server (104) and whenever that resolution reaches the server, people hearing it after that will hear the full resolution. In the long term, this means that if the music is played back later (e.g. two hours after the live performance), it will be at full resolution. In some circumstances, the resolution of some musicians whose bandwidth increases can have the resolution of their part increased as their performance unfolds.

Figure 2:
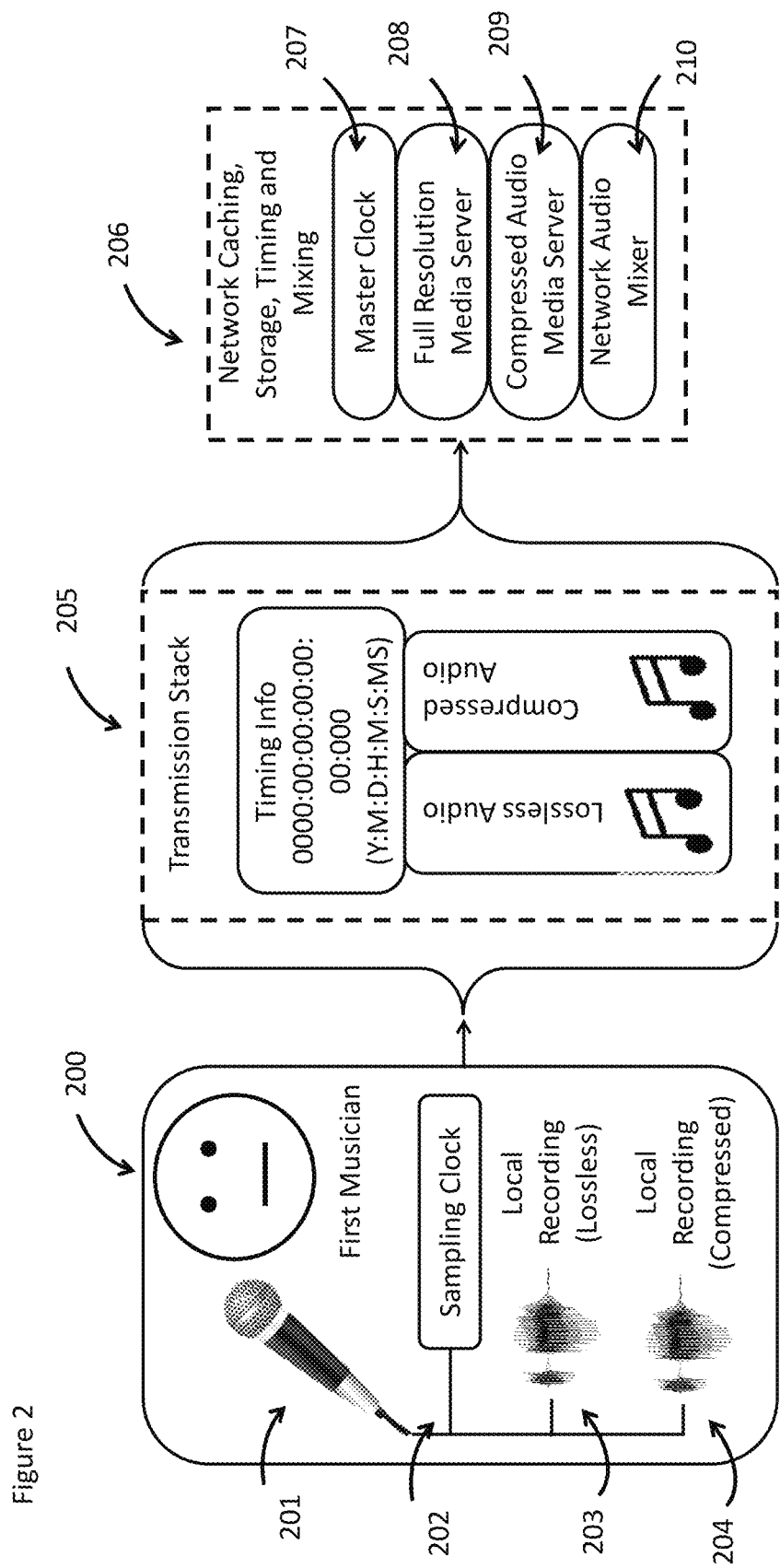
FIG. 2 provides more detail of the first musician, the network stack and the transmission stack.
Figure 2A:
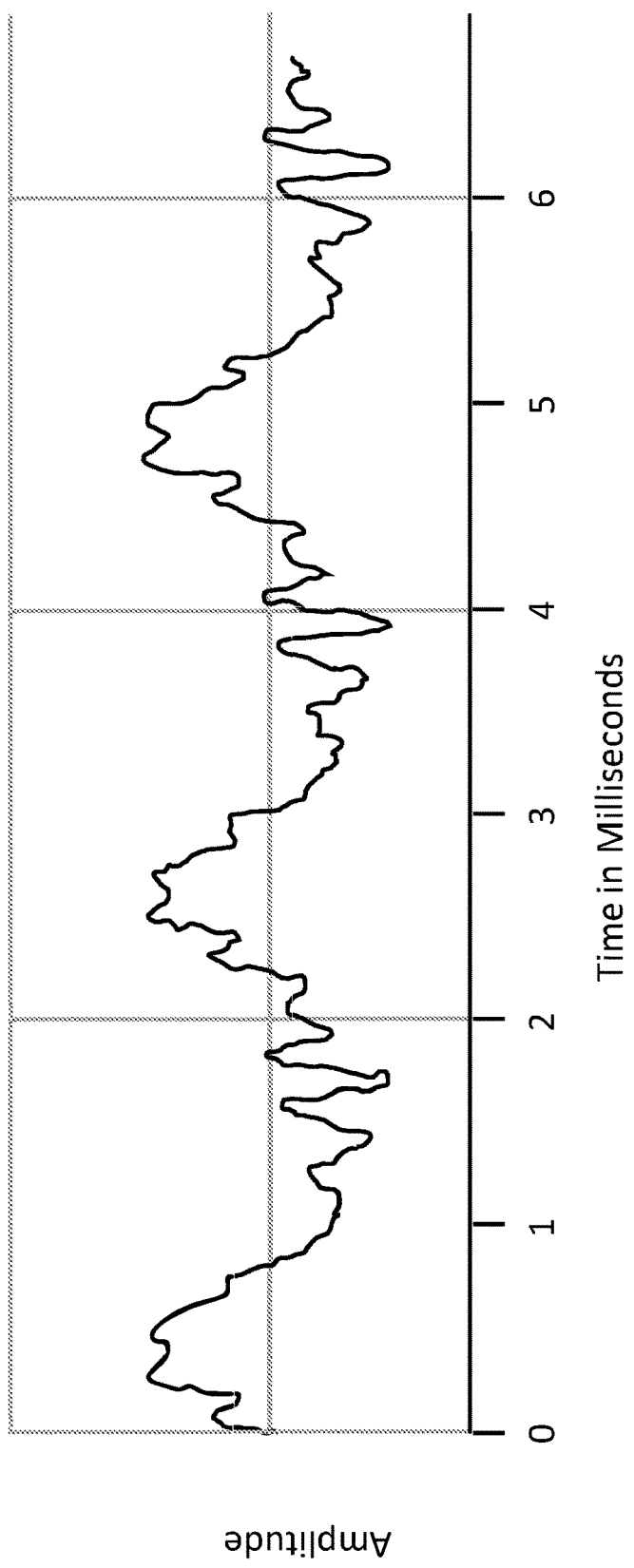
FIG. 2A shows how time relates to a musical sample.

FIG. 2 provides detail to the recording and initial transmission of the audio and timing information. A reliable starting point for the synchronization should be discernable with accuracy by those systems and musicians later in the process. Suppose, for example, a musician counting off (e.g. 1, 2, 3, 4). When the word "one" is recorded, it has a specific and identifiable waveform that happens at a specific time—based on audio waveform samples. Digital waveforms are, by definition, sampled at a frequency (e.g. 44.1 kHz, 48 kHz, 96 kHz, etc.) and the location is always associated with a time. FIG. 2A shows a sample of a cello playing the pitch A4. The fundamental is 440 Hertz which is about 2¼ milliseconds (the perturbations in the waveform are the harmonics and other noise like from bowing). Once a common point in a recording is found, the number of milliseconds from that point to anywhere in the piece can be easily calculated.

Figure 2B:
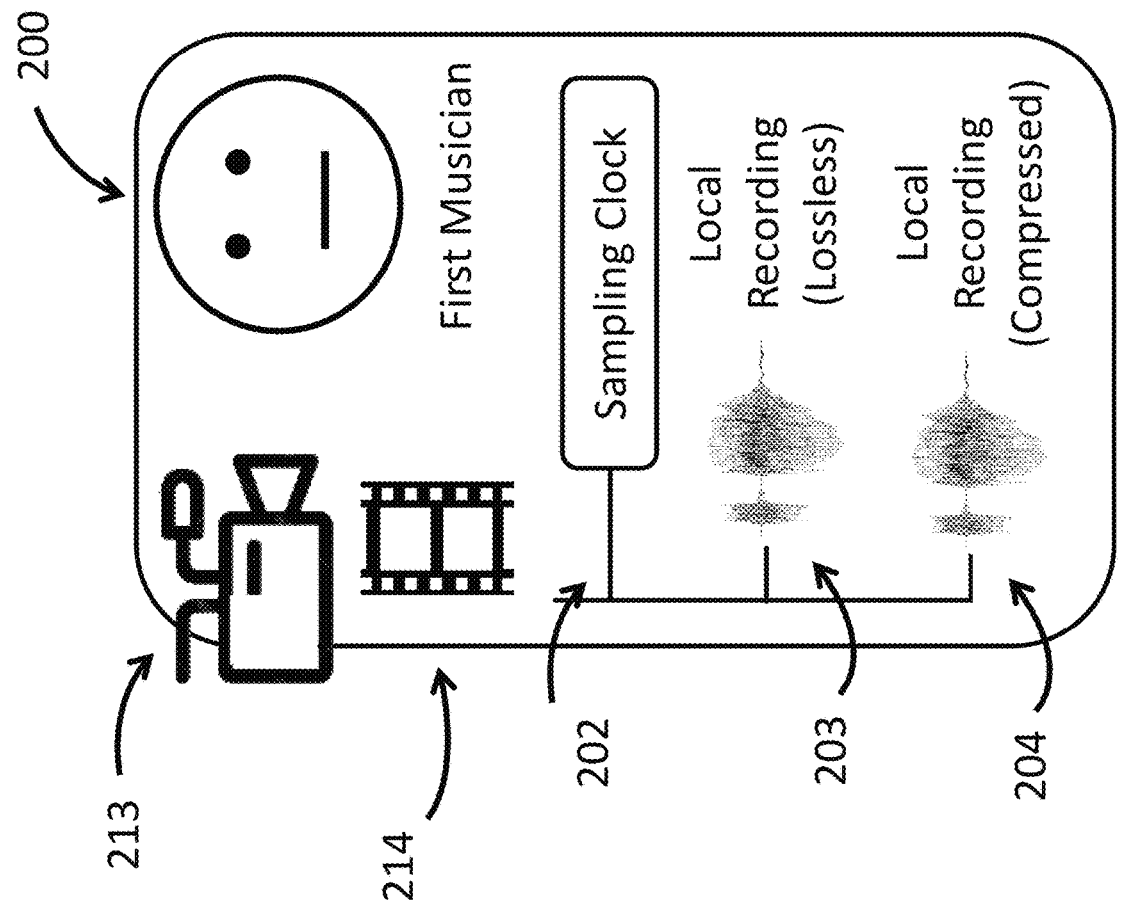
FIG. 2B shows that this could be used with video as well as audio.

The same timing information can be applied to video. If for example, the first musician is the conductor, the musicians could still follow in time (even if not at the same time). In practice, they might need a common rhythm like a click track or drum loop but, theoretically, there is nothing stopping them from all following the same conductor or other visual cue (like scoring to a film). Looking at FIG. 2B, it is similar to the left side of FIG. 2 except that the Microphone (201) has been replaced by a camera (213) and a recording of the video (214) has been added to the recorded elements that are synchronized with the Local Recordings (203, 204) by the Sampling Clock (202).

Going back to FIG. 2, the First musician (200) makes a sound on microphone (201) which starts the clock (202) with some audio (or video as explained above). The sound is recorded at full fidelity (203) and prepared for transmission. From the time the recording equipment is turned on and connected to the network, the network is polled to test the bandwidth. If the bandwidth is sufficient, the full fidelity (lossless) version (203) is then transmitted (205) along with the timing information. However, if the bandwidth is not sufficient, a software module in the first musicians recording environment can compress the audio into smaller file sizes. For example, the audio codec AAC is considered a reasonable fidelity at 128 kilobits per second (kbps) created from a 48 kHz recording. The uncompressed file would stream at 1536 kbps—even using lossless compression that would still be about 800 kbps. [NB: Multiple files at any given resolution when played together will result in a file of higher resolution than if the instruments were recorded as a single recording. For example, 16 channels of 16-bit 48 k audio will, when mixed together, be of higher resolution than 2 channels of 16-bit 48 k audio.] More about balancing latency, bandwidth and quality later in this disclosure.

Regarding the transmission format, the clock will always be bound to each version (both lossless and compressed) of each recording. When looking at the transmission stack (205), it should be viewed as two separate streams, each with the same corresponding time/synchronization code. This way when the music arrives at the Network Caching, Storage, Timing and Mixing Components (Servers/Service) (206), if the service has to switch between resolutions (208, 209), it can use the common (master) clock (207) to remain in perfect sync. When the performances of other musicians are combined, this will be done by the Network Audio Mixer (210).

Figure 3:
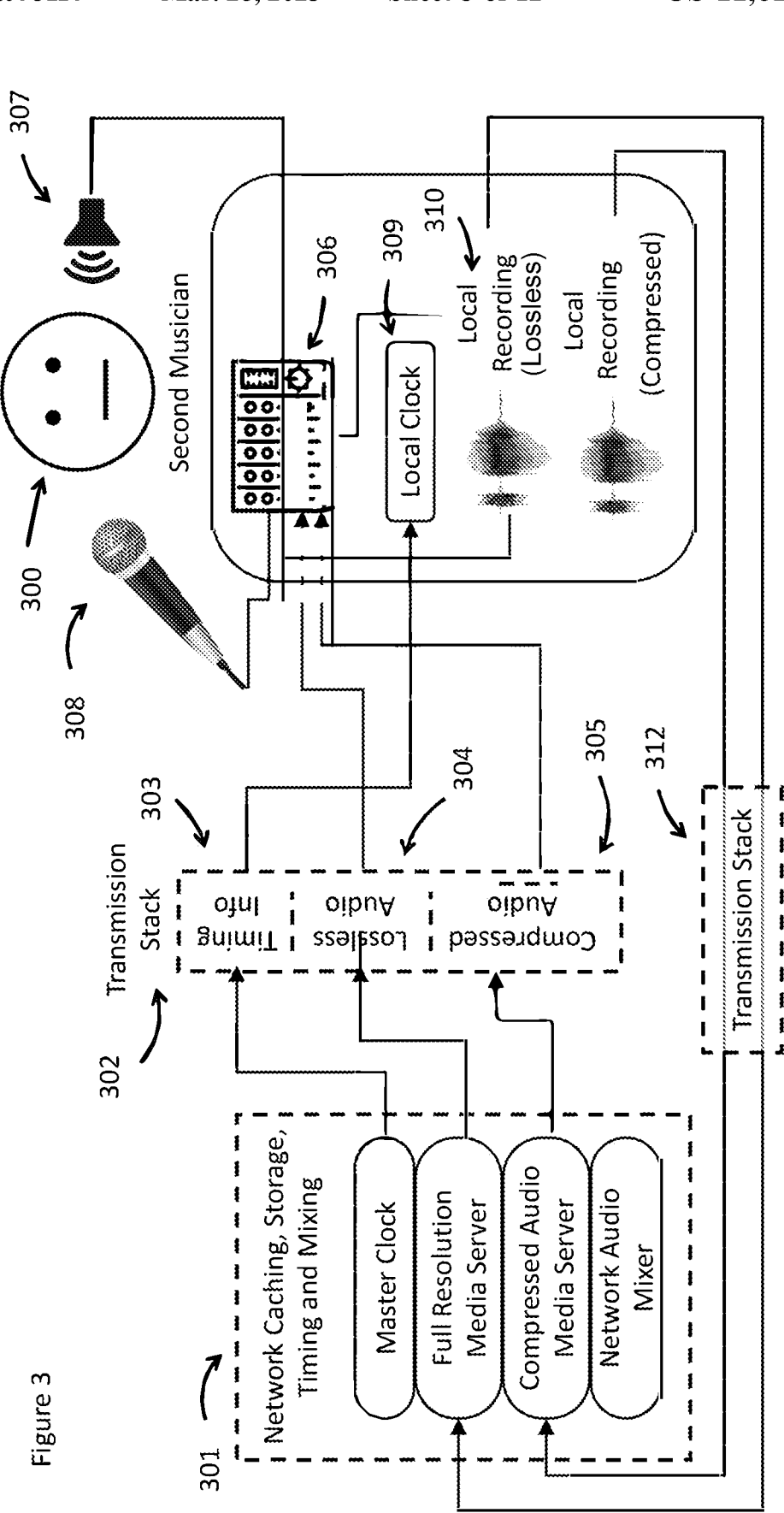
FIG. 3 shows the Network and Transmission Stacks in relation to the second (and further) musician(s).

FIG. 3 shows the addition of a second musician (300). The audio and possibly video comes from the Network Caching, Storage, Timing and Mixing Service (301), where the media from the first musician is stored and is transmitted over the Internet using the Transmission Stack (302) Protocols which include Lossless Audio (304) bound to the Timing Info (303) and, subject to bandwidth, the Compressed Audio (305) also bound to the Timing Info (303). It is possible to include video in this whole process and one practiced in the audiovisual arts can easily build using video based on the data in this disclosure. If there is sufficient bandwidth, there may be no need for the Compressed Audio. When the audio arrives, it will first go into the Mixing Module (306) which will feed the Second Musicians Monitors (307) (likely headphones). When the Second musician plays or sings it will go either by direct injection (for electronic instruments or acoustic-electrical pickups such as piezoelectric or magnetic pickups) or by microphone (308) into the Mixing Module where it is combined (mixed) with audio from the First Musician and the Second Musician can hear both parts as they play along.

The second Musician is recorded losslessly (310) and time stamped using the same clock synchronization (309) as the original recording. The audio from the Second Musician is sent back to the Network Caching, Storage, Timing and Mixing Service (NCSTMS) (301) with the same time code that it received from the original using the same Transmission Stack Protocol (312). The First Musician's audio does not have to be sent back to the NCSTMS because the NCSTMS already has the First Musician's audio and the same synchronized time code. Note that there is a Network Audio Mixer at the NCSTMS which will mix together the performances of the different musicians. This is separate from the mixer at the individual musicians' location.

Figure 4:
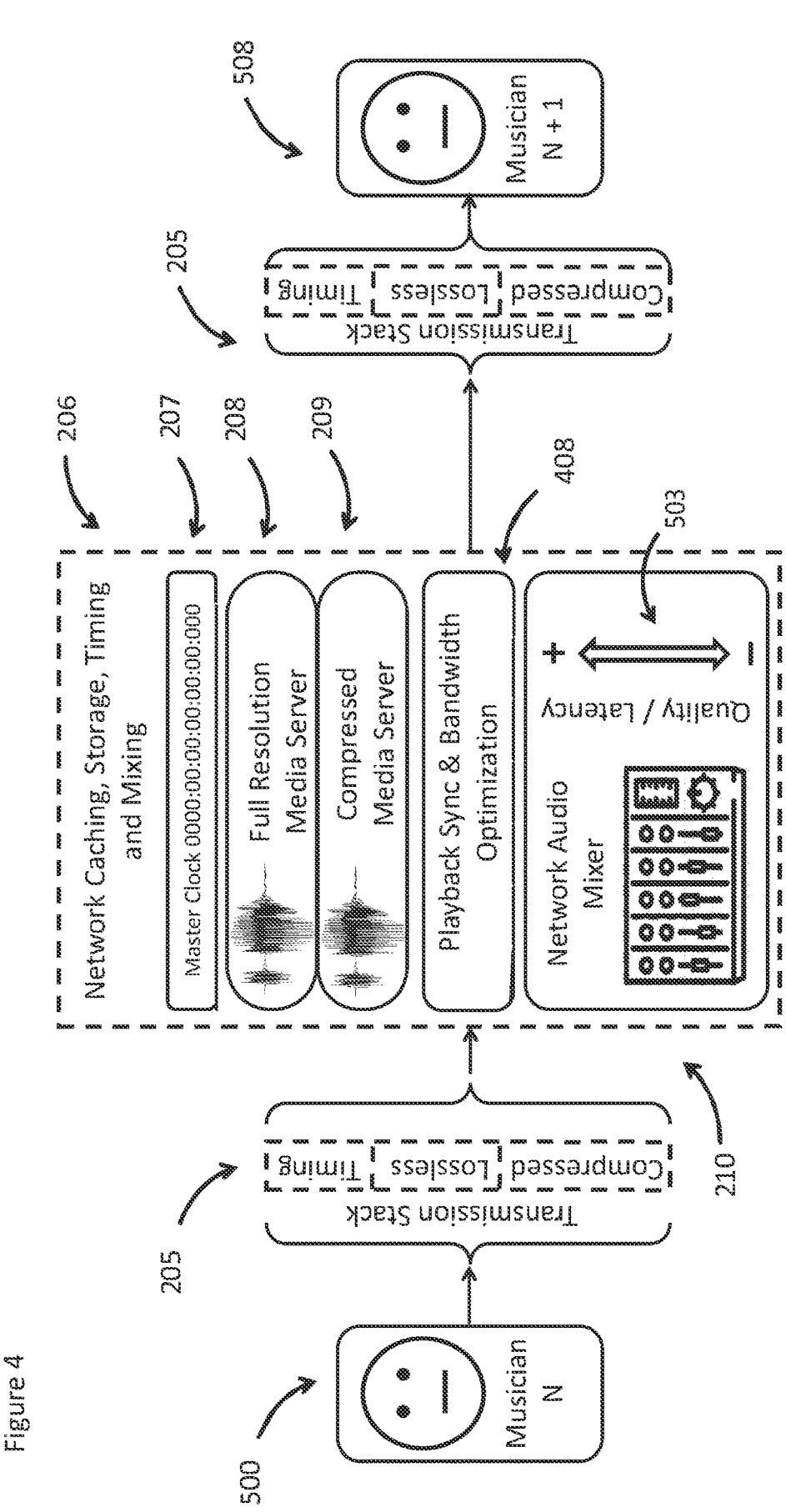
FIG. 4 shows how musicians in the chain are connected by the Network and Transmission Stacks and how Playback Synchronization and Bandwidth are optimized.

FIG. 4 shows Playback Sync & Bandwidth Optimization module (408). As mentioned above, synchronization is based on a common time code that is shared across all resolutions of audio (and video). There may be at times a tradeoff between quality and latency. Suppose a musician (Musician N) is transmitting at full resolution at 800 kbps (compressed losslessly) and the next musician (Musician N+1) has less bandwidth. If for example, based on having tested the network for throughput, for Musician N to stream at 800 kbps, s/he would have to cache enough music so that the latency was 15 seconds. However, if Musician N received and sent audio at 128 kbps, the latency would only be 75 milliseconds. The Playback Sync & Bandwidth Optimization module (408) could choose the resolution and hence required bandwidth to send the audio to Musician N+1.

Figure 5:
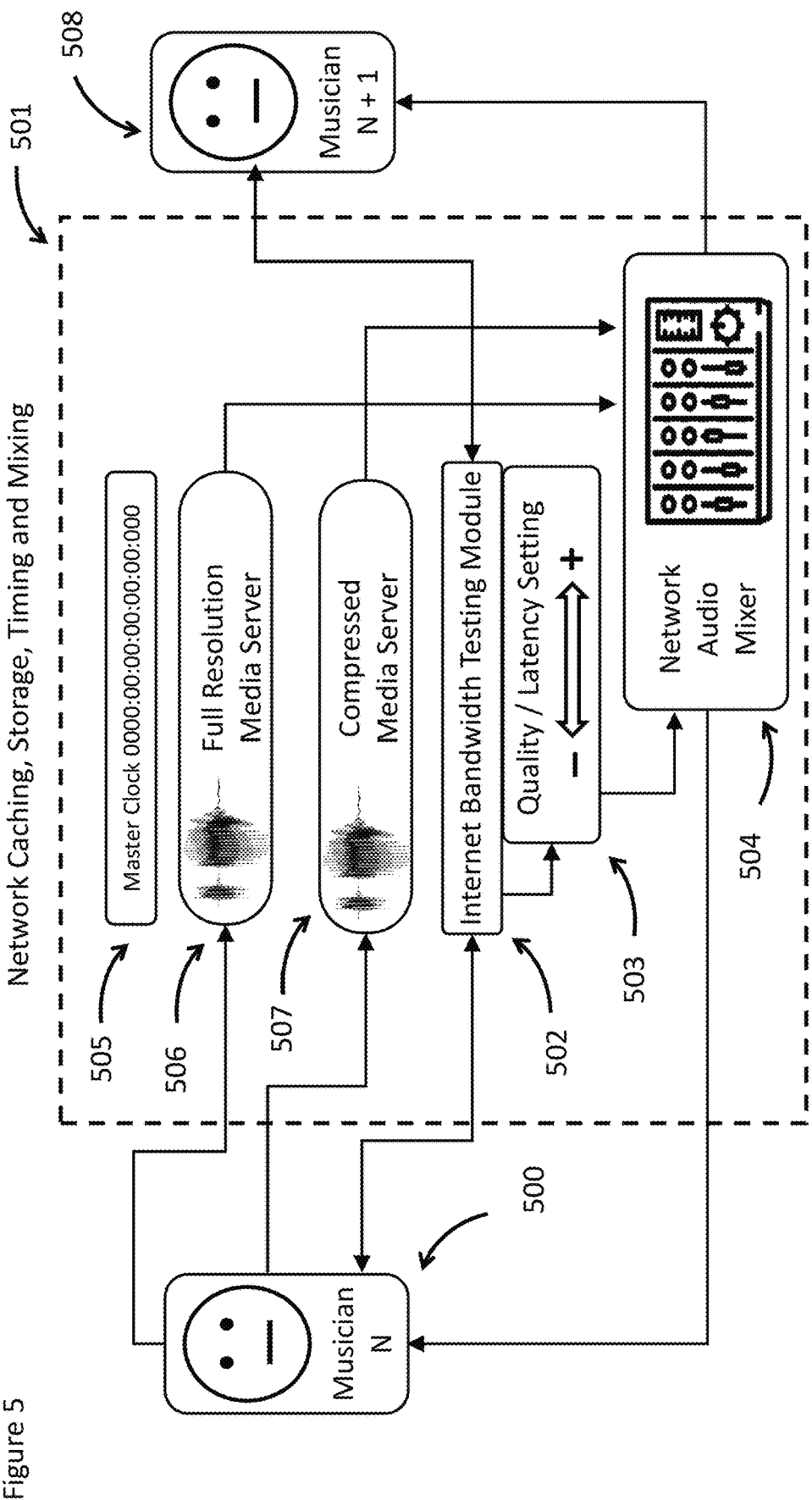
FIG. 5 shows how the Network Caching, Storage, Timing and Mixing modules work together when the music is going from one musician to the next.
Figure 6:
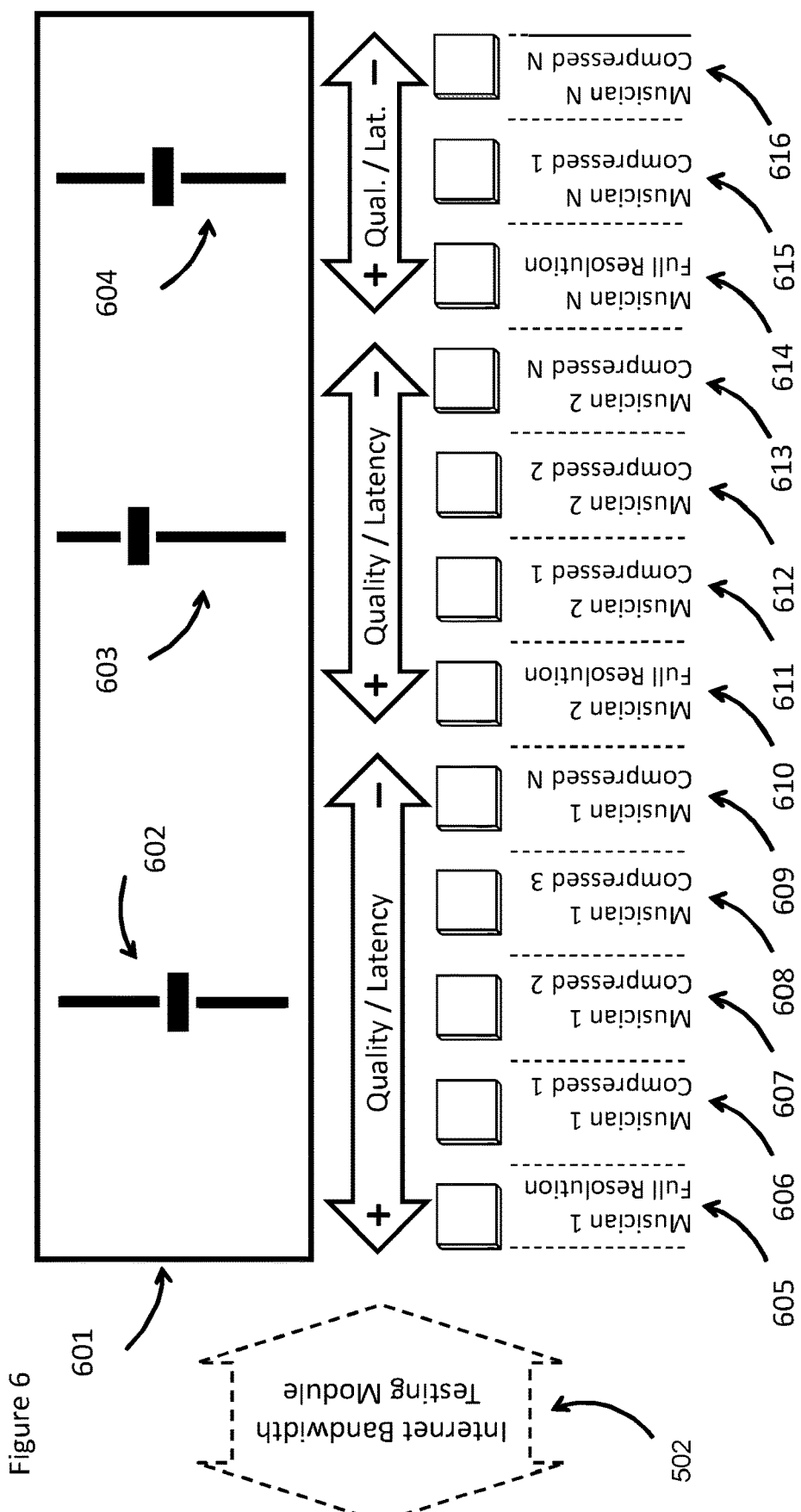
FIG. 6 shows how Internet Bandwidth, Latency, Quality and Mixing work together.

To see this in a bit more detail, look at FIGS. 5 and 6.

FIG. 5 shows Musician N (500). To know the likely available bandwidth between Musician N (500) and the NCSTM module (501), the Internet Bandwidth Testing Module (502) is used. It is fairly standard practice to "ping" the network and find out the bandwidth between two points and this capability is available to anyone practiced in the arts. Based on the available bandwidth, the Quality/Latency Setting Module (503) will make decisions (as shown in more detail in FIG. 6) about what resolution of media the Network Audio Mixer should send to Musician N. Depending on the bandwidth, Musician N will send their media to the Full Resolution Media Server (506) or the Compressed Media Server (507) along with the Synchronization Time Code which goes to the Master Clock (505). It should be noted that "Server" means any server configuration from a hard drive on a home computer to an array of servers distributed widely across the Internet. Also, "Compressed Media Server" can include multiple resolutions of video and or audio and could be distributed as well. In order to send the media to Musician N+1 (508), the next musician in the chain, the bandwidth must again be tested by the Internet Bandwidth Testing Module (502). This determines what resolution the media will be sent at to Musician N+1. Note that media sent to musician N+1 is not all the individual recordings of the musicians that have played before but rather, a single mixed track that combine all of their performances. Suppose for example, Musician N+1 is the 5th musician in the chain and the previous musicians have had the following bandwidth limitations on their performance quality: Musician 1, 800 kbps (full lossless); Musician 2, 450 kbps; Musician 3, 800 kbps; Musician 4, 325 kbps and Musician 5, 800 kbps. The media will come from a combination of Full Resolution Media Servers (506) and Compressed Media Servers (507) where it will be fed into the Network Audio Mixer (504). The combined "mix" will be sent to Musician N+1. Note that in the combined mix, the parts from musicians 1 and 3 will be of higher resolution than the parts from musicians 2 and 4. Note also that the only media that will be sent back to the NCSTM module will be the new performance by Musician 5 as the other performances are already Cached. So, any bandwidth limitations in connecting to Musician 5 will only affect the quality of Musician 5's part and even then, it will only affect it for the musicians in the chain—not the final listener who can (depending on when they listen) receive the full fidelity of all the musicians.

FIG. 6 shows the bandwidth, quality, latency and mixing components of the system. The effect of bandwidth on the quality of the music happens in both directions. The upload bandwidth affects the quality of the initial transmission of individual performances (the later transmission of that same performance and still be at full resolution). The download bandwidth effects the quality that the musician hears when they are playing along.

The Uploading Musician's operating environment will have its own ability to gauge bandwidth so that there may be, for example, full bandwidth (605) at some moments in time or depending on the bandwidth, there might be different levels of compression (606, 607, 608, 609). The system will seamlessly stitch together the various resolutions using the common time code with only the quality (not the timing) varying over time. All of these will be virtually bussed to a single fader for this musician levels in the mix (there may be a human manning the faders or there could be an algorithm doing the mixing). This is true for the second musician in the chain (610, 611, 612, 613) etc. through to the Nth musician (614, 615, 616). These levels are combined in the mix and it is that mix which goes out to the next musician in the chain (508) at their bandwidth. Note that the bandwidth of the transmission from the NCSTM to any individual musician will typically (as is done commonly today) be sent at the appropriate bandwidth to assure no latency. This is independent of the upload bandwidth from each musician. For example, if one musician has particularly low bandwidth, they may receive a lower quality stream. However, they will still be recorded at full fidelity in their local environment and the quality of their performance to the low latency listener will be a reflection of their upload bandwidth. Of course, as mentioned earlier, once their full resolution performance has been uploaded, a subsequent listener will hear it at full resolution (of course, subject to that listener's bandwidth).

Figure 7:
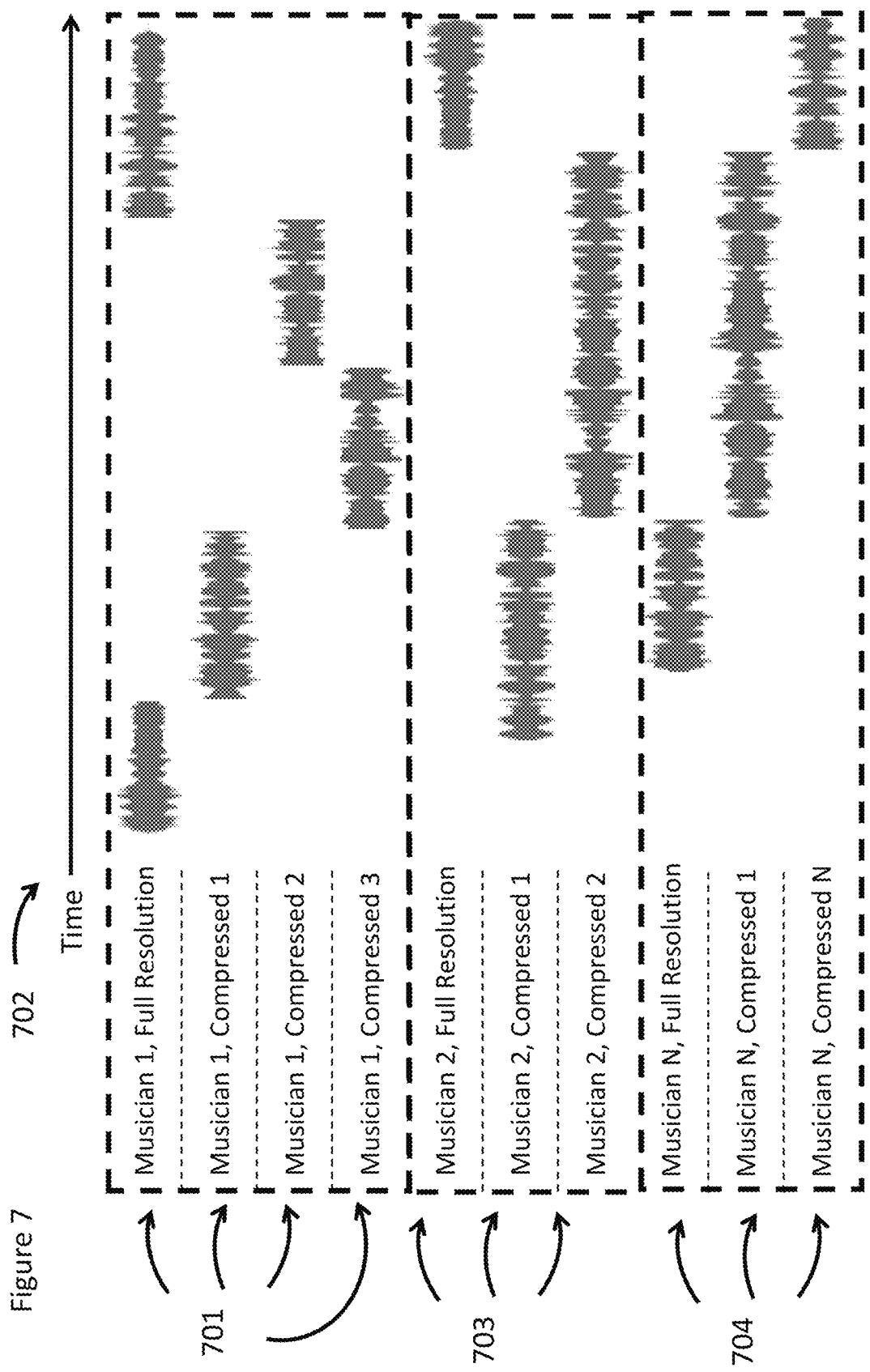
FIG. 7 shows how an individual performance can be made of different resolutions.

To clarify the discussion of different resolutions, it may be helpful to look at FIG. 7. This shows how the different resolutions of audio can be recorded and stored. Note the different resolutions from the first musician (701) displayed as multiple waveforms over time (702). Subsequent musicians would hear the performance from the first musician at variable resolution but as one single performance. The second musician might also be recorded at multiple resolutions (703) as would the following musicians (704). As described above, these different performances would be mixed together by a mixing engineer (601) using faders (602, 603, 604) so that they can be heard by following musicians or audience members. Note again that once higher resolutions of portions of the audio have been uploaded to the Network Caching, Storage, Timing and Mixing Components, they can be used in subsequent mixes (e.g. after the end of the performance) to improve the quality.

Figure 8:
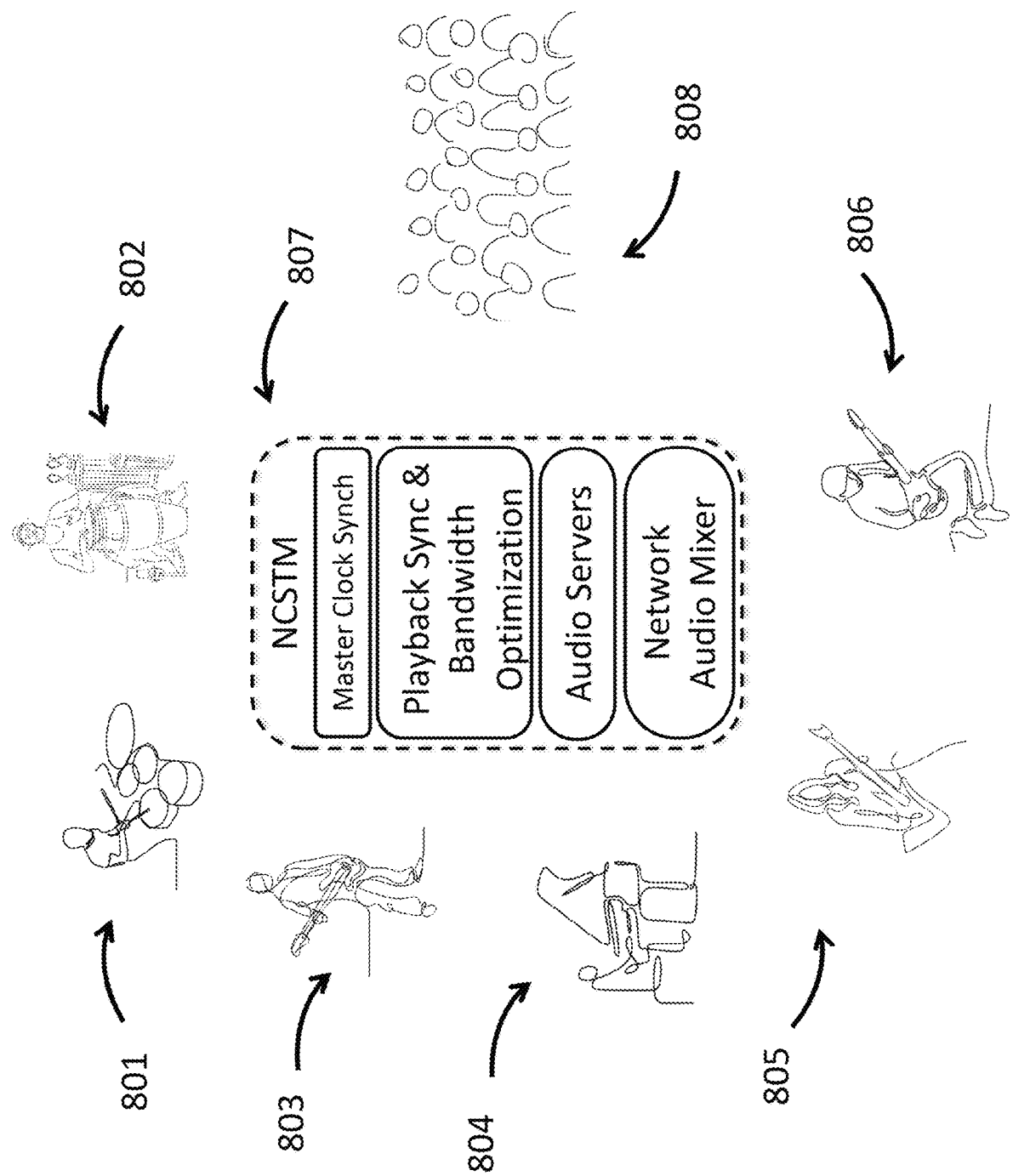
FIG. 8 shows an exemplary jam band scenario.

As a use case, let's look at a jam band scenario as shown in FIG. 8. Let's assume there are 6 musicians who play: drums (801), percussion (802), bass (803), piano (804) and two guitars (805 & 806). They are all connected to the NCSTM (807)—as is the audience (808). Suppose you have the drummer start and after two bars the percussionist and the bass player join. Other musicians can join immediately or after some number of bars. Each musician can only hear the musicians before them in order, but you can change the order by laying out.

Figure 9:
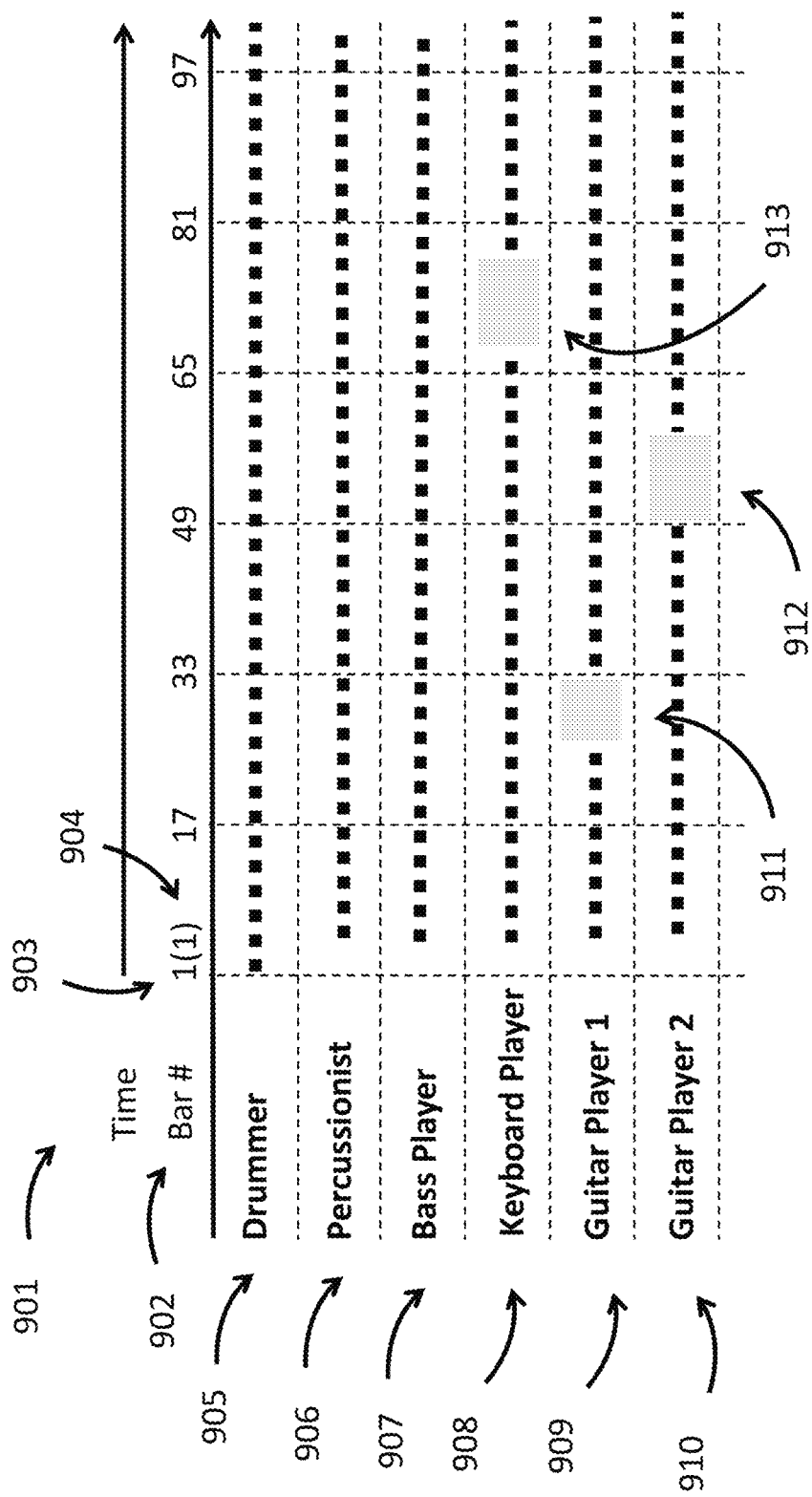
FIG. 9 shows an exemplary timing situation for the jam band scenario.

Looking at FIG. 9, the actual time on the clock (901) is moving forward without pause but the actual bar numbers (902) move in time with the musicians. Bar 1 for the drummer (903) is the beginning but bar 1 of each following musician (904) is a little behind—each a bit more than the one that came before it. The drummer (905) starts followed by the percussionist (906), the bass player (907) and the keyboard player (908). Suppose one guitar player (909) starts right after the keyboard player but before the second guitar player (910), but s/he would like to be able to hear the other guitar while soloing. When we say "starts before" in this context, we are referring to the "Network Order" not to be confused with musical order. S/he (or a mixing engineer on a predetermined cue) could hit a reset or "change position" and they would begin hearing the audio at the time of the new position.

In FIG. 9, the grey areas (911, 912 & 913) represent someone laying out. So, suppose there was a total of 2 seconds of latency, when the guitar player hit the switch, they would hear the music from 2 seconds after where they were but with all the musicians playing. So, if I were to lay out for a bar or two, I could rejoin while hearing the other musicians. It might be easier to choreograph this if there was an interactive chord chart that kept track of the location in the song though musicians might get pretty good at recognizing where they are quite quickly.

Now in this imagined jam band scenario, musicians could take turns laying out and coming back in hearing others play—even the drummer or percussionist could lay out and return a few beats later but hearing the other musicians. You do not necessarily have to go to the end of the queue. Perhaps the singer is always last in the queue and "dropping back" would only take you to next to last or you could drop back just one or two places. For example, the drummer and percussionist could trade places. There could be a lot of question and answer type playing but you wouldn't hear your answers until the final playback.

Figure 10:
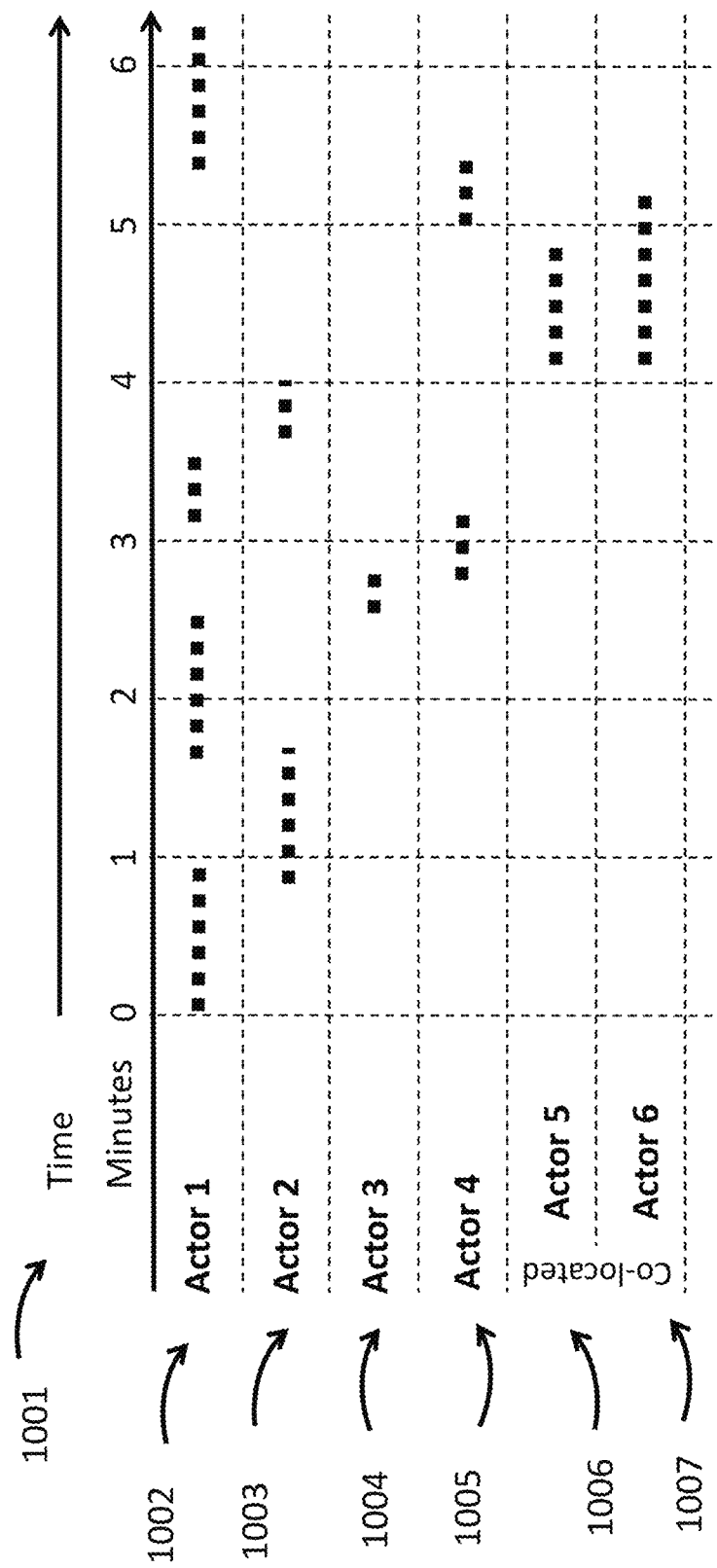
FIG. 10 shows an exemplary theatrical podcast scenario.

Another use case would be the Theatrical Podcast Scenario. In this scenario, as shown in FIG. 10, we have a number of actors creating a near live performance online. This could be scripted, or it could be spontaneous like an interview or like a reality show. We can do what we were doing above but we have some other options available to us. Spoken word is not as time sensitive as music and so we may have the ability to play with the time a bit more. Also, the performances are more serial than parallel and are more flexible in their fidelity requirements. In the Jam band scenario, when one musician lays out for a few bars, s/he can be placed later in the queue. Also, the time of the intervening performances can be compressed. Let us imagine a play with 6 actors (1002, 1003, 1004, 1005, 1006 & 1007). For interest's sake, let's assume that Actors 5 & 6 (1006 & 1007) are co-located. Tracking the time (1001), we start with Actor 1 (1002) who speaks for a little less than a minute. Actor 2 (1003) is hearing it in what, for them, is real time. Now actor 1 is planning on rejoining a bit less than a minute later. Let's assume, for arguments sake that the latency between actors 1 and 2 is 100 milliseconds. As soon as Actor 1 finishes, s/he can jump the queue. However, there are two constraints: 1) Actor 1, does not want to miss any of what Actor 2 has to say and 2) Actor 1 wants to hear at least the last part of Actor 2's part in as unaltered a state as possible so that their timing and inflection will be as natural as possible. So, the solution is as follows: When Actor 1 jumps the queue, they are 100 milliseconds behind Actor 2—that is Actor 2 has already been speaking for 100 milliseconds. So, when Actor 1 jumps back into the queue, that 100 milliseconds must be made up. It is a commonly used technology to speed up a recording without changing the pitch. So, when Actor 1 jumps back in the queue, s/he will hear Actor 2 played back from the recording but sped up. If it is sped up by 10% (barely perceptible without pitch change) and the total latency is 100 milliseconds, then Actor 1 will be hearing Actor 2 in Actor 1's real time at real speed. This can continue indefinitely with multiple actors coming in and catching up as necessary. As with the music recording scenarios, the final product (in the case of spoken word with added sound effects) would probably only be a few minutes behind real-time live.

Modifications may be made without departing from the essential teachings of the present invention. Various alternative systems may be utilized to implement the various methodologies described herein and various methods may be used to achieve certain results from the aforementioned systems.

What is claimed is:

1. A method for performing and recording live internet music near live with no latency, the method performed by a processor executing instructions stored in a memory, the instructions comprising:
   generating an electronic count-in;
   binding the electronic count-in to a first performance to generate a master clock;
   transmitting a first musician's first performance and first timing information to a network caching, storage, timing and mixing module;
   receiving the first musician's first performance by a sound device of a second musician and the second musician creating a second performance;
   transmitting the second performance and a second timing information to the network caching, storage, timing and mixing module;
   receiving a first mixed audio by a sound device of a third musician and the third musician creating a third performance, the first mixed audio comprising the first and the second performances along with the first and the second timing information;
   transmitting the third performance and a third timing information to the network caching, storage, timing and mixing module; and
   receiving a second mixed audio by a sound device of a fourth musician and the fourth musician creating a fourth performance, the second mixed audio comprising the third performance along with the third timing information with the first mixed audio.

2. The method of claim 1, further comprising recording the first musician's first performance locally at full resolution and transmitting it to a full resolution media server; and transmitting the first timing information to the master clock.

3. The method of claim 1, further comprising transmitting one or more lower resolution versions of the first musician's first performance to a compressed audio media server; and transmitting the first timing information to the master clock.

4. The method of claim 1, further comprising receiving, on a plurality of sound devices from a network audio mixer, combined performances of individual musicians for each other to hear and receiving on a plurality of sound devices combined cumulative performances of all of the individual musicians for an audience to hear.

5. The method of claim 1, further comprising receiving on a sound device from a network audio mixer audio with increased resolution.

6. The method of claim 1, further comprising the electronic count-in having a specific and identifiable waveform that happens at a specific time based on audio wave form samples.

7. The method of claim 1, wherein the electronic count-in is a video.

8. The method of claim 1, wherein the electronic count-in is audio and video.

9. The method of claim 1, further comprising:
   activating recording equipment;
   polling a network to test bandwidth;
   if the bandwidth is sufficient, transmitting full fidelity digital data with the timing information; and
   if the bandwidth is not sufficient, compressing audio into a smaller file size.

10. The method of claim 1, further comprising the first timing information including timing information for lossless and compressed versions of each recording.

11. The method of claim 10, further comprising remaining in synchronization when switching between the lossless and compressed versions while streaming a recording.

12. A system for performing and recording live internet music near live with no latency, the system comprising:
   a processor; and
   a memory communicatively coupled with the processor, the memory storing instructions which when executed by the processor perform a method, the method comprising:
      generating an electronic count-in;
      binding the electronic count-in to a first performance to generate a master clock;
      transmitting a first musician's first performance and a first timing information to a network caching, storage, timing and mixing module;
      receiving the first musician's first performance by a sound device of a second musician and the second musician creating a second performance;
      transmitting the second performance and a second timing information to the network caching, storage, timing and mixing module;

receiving a first mixed audio by a sound device of a third musician and the third musician creating a third performance, the first mixed audio comprising the first and the second performances along with the first and the second timing information;

transmitting the third performance and a third timing information to the network caching, storage, timing and mixing module; and receiving a second mixed audio by a sound device of a fourth musician and the fourth musician creating a fourth performance, the second mixed audio comprising the third performance along with the third timing information with the first mixed audio.

13. The system of claim 12, further comprising the instructions including recording the first musician's first performance locally at full resolution and transmitting it to a full resolution media server; and transmitting the first timing information to the master clock.

14. The system of claim 12, further comprising the instructions including transmitting one or more lower resolution versions of the first musician's first performance to a compressed audio media server; and transmitting the first timing information to the master clock.

15. The system of claim 12, further comprising the instructions including receiving, on a plurality of sound devices from a network audio mixer, combined performances of individual musicians for each other to hear and receiving on a plurality of sound devices combined cumulative performances of all of the individual musicians for an audience to hear.

16. The system of claim 12, further comprising the instructions including receiving on a sound device from a network audio mixer audio with increased resolution.

17. The system of claim 12, further comprising the instructions including the electronic count-in having a specific and identifiable waveform that happens at a specific time based on audio wave form samples.

18. The system of claim 12, further comprising the electronic count-in being a video.

19. The system of claim 12, further comprising the electronic count-in being audio and video.

20. The system of claim 12, further comprising the instructions including:
    activating recording equipment;
    polling a network to test bandwidth;
    if the bandwidth is sufficient, transmitting full fidelity digital data with the timing information; and
    if the bandwidth is not sufficient, compressing audio into a smaller file size.

21. The system of claim 12, further comprising the first timing information including timing information for lossless and compressed versions of each recording.

22. The system of claim 21, further comprising remaining in synchronization when switching between the lossless and compressed versions while streaming a recording.

* * * * *